(12) United States Patent
Berg

(10) Patent No.: US 6,384,404 B1
(45) Date of Patent: May 7, 2002

(54) DEVICE FOR MEASURING A BENDING LOAD

(75) Inventor: Arne Berg, Kattem (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 09/555,504

(22) PCT Filed: Dec. 3, 1998

(86) PCT No.: PCT/NO98/00359

§ 371 Date: Jun. 5, 2000

§ 102(e) Date: Jun. 5, 2000

(87) PCT Pub. No.: WO99/32862

PCT Pub. Date: Jul. 1, 1999

(30) Foreign Application Priority Data

Dec. 5, 1997 (NO) ............................................ 19975657

(51) Int. Cl.[7] .................................................. G01I 3/18

(52) U.S. Cl. .............................. 250/227.16; 250/227.18; 385/12; 356/32

(58) Field of Search ....................... 250/227.14, 227.16, 250/227.18; 385/12, 13, 10, 77; 73/800; 356/32

(56) References Cited

U.S. PATENT DOCUMENTS 6,246,048 B1 * 6/2001 Ramos et al. .......... 250/227.18
6,337,737 B1 * 1/2002 Chang et al. .................. 356/32

* cited by examiner

Primary Examiner—Robert H. Kim
Assistant Examiner—Hoon K. Song
(74) Attorney, Agent, or Firm—Dennison, Scheiner & Schultz

(57) ABSTRACT

A device is provided for measuring a bending load in mechanical constructions, which device enables measurement over a broad range of stresses with high precision and which simultaneously compensates for deviations caused by temperature fluctuations.

7 Claims, 5 Drawing Sheets

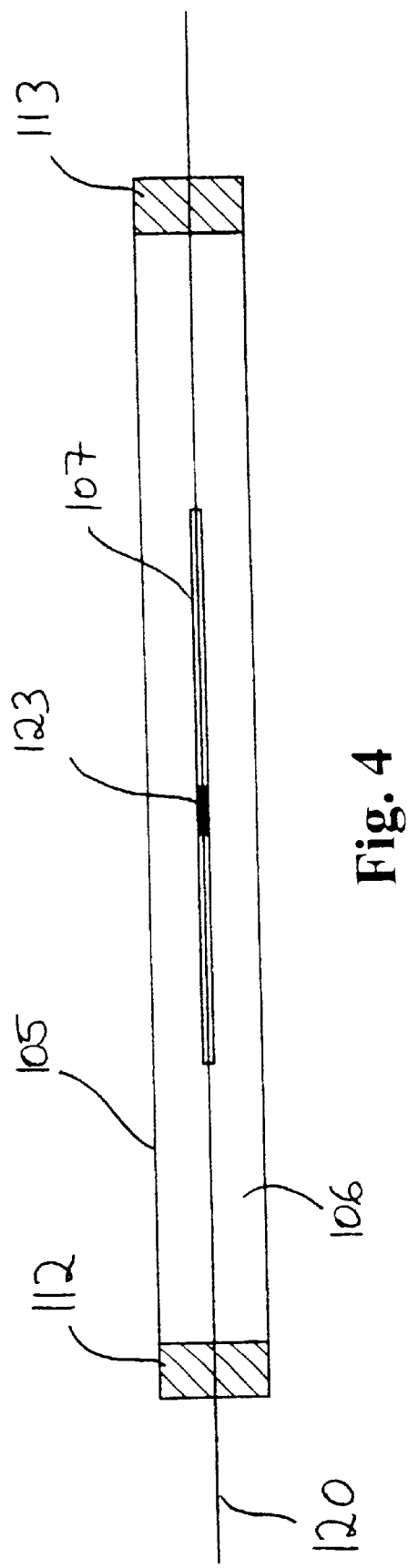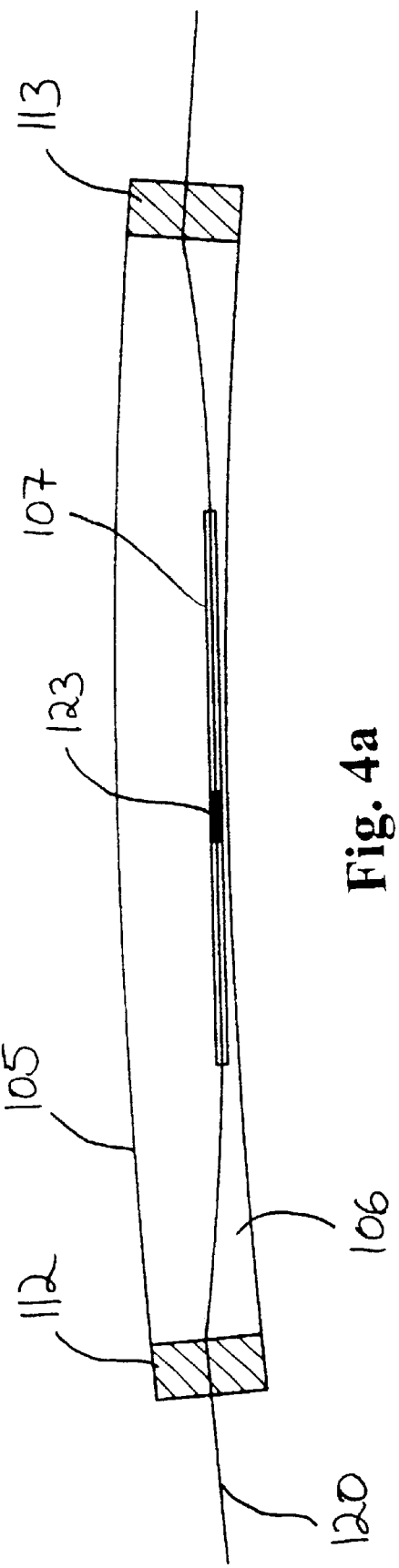
Fig. 4
Fig. 4a

DEVICE FOR MEASURING A BENDING LOAD

The present invention concerns a device for measuring a bending load in constructions, according to the introductory part of claim 1.

BACKGROUND OF THE INVENTION

The present invention is based upon the principle of using a fibre optic Bragg grating. A Bragg grating is a single mode fibre having permanent periodical variation in the refraction index over a fibre length of for example 0,1 to 10 cm. Variation in the refraction index is established by illuminating the fibre with an UV-laser. A bragg grating reflects light at a wave length given by the refraction index and the period related to space for the variation in refraction index (grating period), while light outside this wave period will pass the grating more or less unhindered. The light reflected by the Bragg grating will give a wave length which varies as a function of a measuring dimension changing the refraction index of the fibre material in the grating and/or by the fibre length in the grating zone (the grating period). Tension in the fibre or temperature will thus give a change in wavelength for the light reflected in the Bragg grating.

In practical use, temperature can be measured in the range −100° C. to +250° C. at approximately 20 points along a fibre having a length of 50–100 km. Using various multiplexing techniques, the number of measurement points can be increased. Examples of areas of application are temperature surveillance of power cables, pipelines, electrical transformers, engines and temperature monitoring of industrial processes.

A number of devices for measurement of bending in mechanical constructions exist. For special purposes where there is little space available or there is high temperature, high tension and so forth, all known devices for measurement of bending load have functional disadvantages. For example, measuring bending under water is made with bending sensitive sensors based on electrical elements, which in such environments exhibit low reliability. For other areas of application there may be little space available for installing extra components, such as bend sensors based on electrical induction or capacity (typical diameter 10–20 mm). Another problem with sensors based upon electrical effects is electrically induced noise. For example lightning strikes have sometimes rendered sensor elements or electronic circuits passive, and thus disabled the bend monitoring.

Accordingly, there is a need for a bend sensor with mainly passive components, that can be utilized in difficult environments and restrictive spaces.

The objective of the present invention is to provide a device for measuring bending in and on mechanical constructions.

SUMMARY OF THE INVENTION

The objective is achieved with a device according to the characterizing part of Claim 1. Further features are disclosed in the dependent claims.

The invention relates to a device for measuring bending in mechanical constructions, the device comprising:

- a first sensor for measuring a bending load, said sensor including a housing connected to an optical fibre mounted/prestressed in a first anchoring point and a second anchoring point by the housing, wherein the fibre is provided with a first Bragg grating, located in the prestressed fibre, the housing being arranged so that the fibre, when exposed to a strong bending force on the housing, is not brought in contact therewith and is exposed to tension load,
- a second sensor for measuring tension load, said sensor including a housing connected to an optical fibre prestressed in a first anchoring point and a second anchoring point by the housing, wherein the fibre is provided with a second Bragg grating, located in the mounted/prestressed fibre, the housing being arranged with an element forcing the fibre to bent along with the housing,
- a third sensor for measuring temperature, said sensor including a housing attached to an optical fibre suspended in a first anchoring point and a second anchoring point by the housing without prestressing the fibre, wherein the fibre includes a third Bragg-grating located in the suspended fibre, the housing being arranged so that the fibre, by a strong bending or tension of the housing, is not brought into contact therewith and is exposed to tension load,
- wherein one or more of the respective sensors are arranged sequenteally in the housing along the common optical fibre.

The Bragg-grating in the first sensor will be influenced by bending, tension and thermal effects. The Bragg-grating in the second sensor will mainly is only influenced by tension and thermal effects (for example expansion in the second sensor), while the Bragg-grating in the third sensor only is influenced by thermal effects. By combining two or three of the sensors described above, effects from tension and temperature are compensated so that the device measures correct bending forces. All sensors can be integrated into the same housing.

The principal design of a bend measuring sensor according to the present invention renders it possible to produce bend measuring sensors with very small dimensions capable of measuring both small and large bending radii from distant positions. The device also has the capability of measuring bending in different positions along the same optical fibre.

Examples of mechanical constructions are constructions where the present invention is applicable include bridges, flexible pipes and the like.

BRIEF DESCRIPTION OF THE DRAWINGS

In the following, the invention is described in further detail with reference to a preferred embodiment illustrated by the accompanying drawings, where:

FIG. 4 shows an alternative embodiment of the the device illustrated in FIG. 3, FIG. 4a shows the device from FIG. 4 during bending.

DETAILED DESCRIPTION OF THE INVENTION

Figure 1:
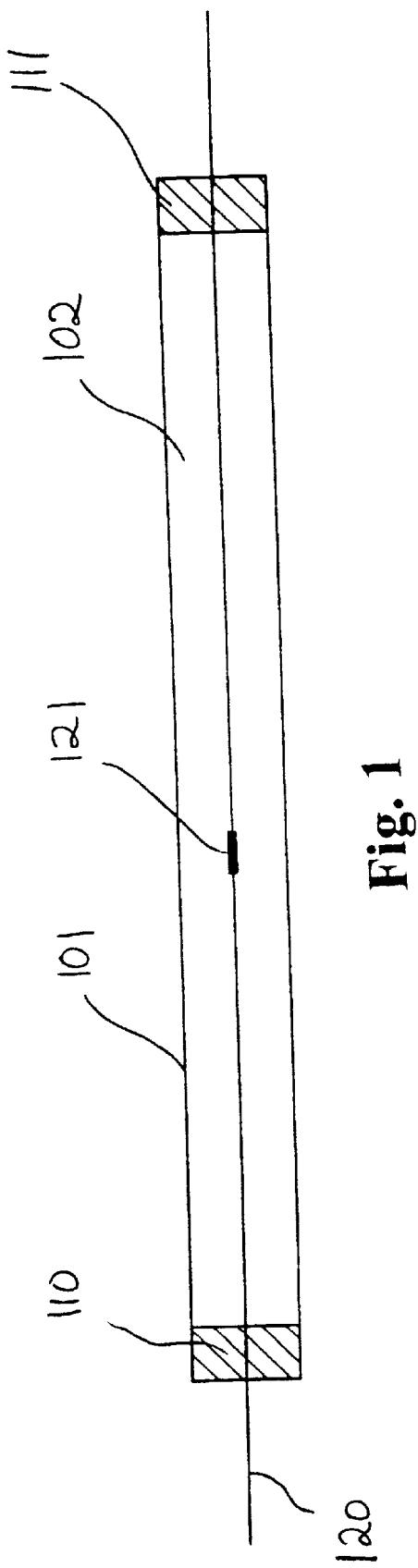
FIG. 1 shows an axial cross-section view of a first sensor for use in a device according to the present invention for monitoring bending in mechanical structures.
Figure 1A:
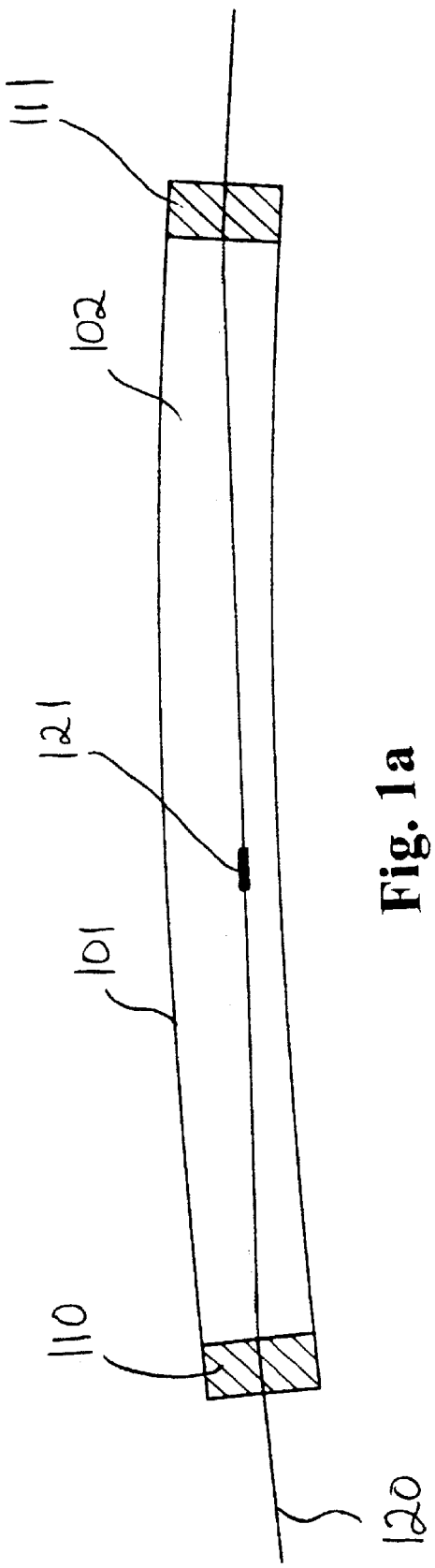
FIG. 1a shows the device from FIG. 1 during bending.

FIG. 1 shows a first embodiment of a first sensor according to the present invention. This first sensor includes a generally cylindrical housing 101 with an inner cylindrical bore 102. Inside the bore is arranged an optical fibre 120 prestressed between a first and second anchoring point 110, 111. A first Bragg grating 121, which in reality is integrated into the optical fibre 120, is in the figure, for ease of reference, indicated as a hatched rectangle, located on the freely prestressed fibre section. FIG. 1a shows the bending sensor and location of the fibre 120 and grating 121 when the housing 101 is being strongly bent. The bore 102 has an inner diameter which is sufficiently large for the grating so that it is not exposed to tension load during strong bending. The length and diameter of the housing will vary with the particular area of use.

During bending, the Bragg grating 121 will be relaxed, where as the light reflected from the Bragg grating 121 will be influenced by bending, tension and thermal effects from the surrounding atmosphere and from the next construction, which is to be measured.

Figure 2:
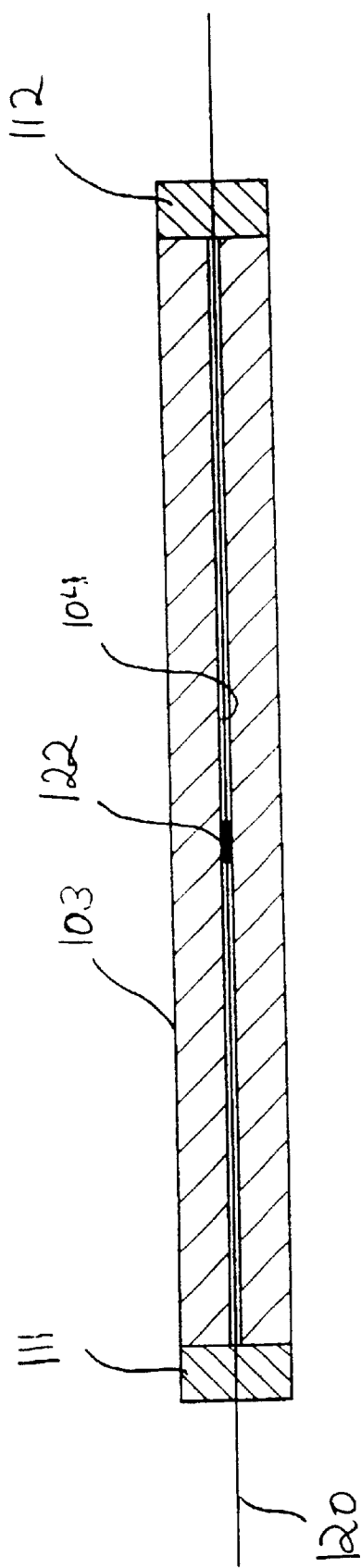
FIG. 2 shows an axial cross-section view of a second sensor for use in a device according to the present invention for monitoring bending in mechanical structures.
Figure 2A:
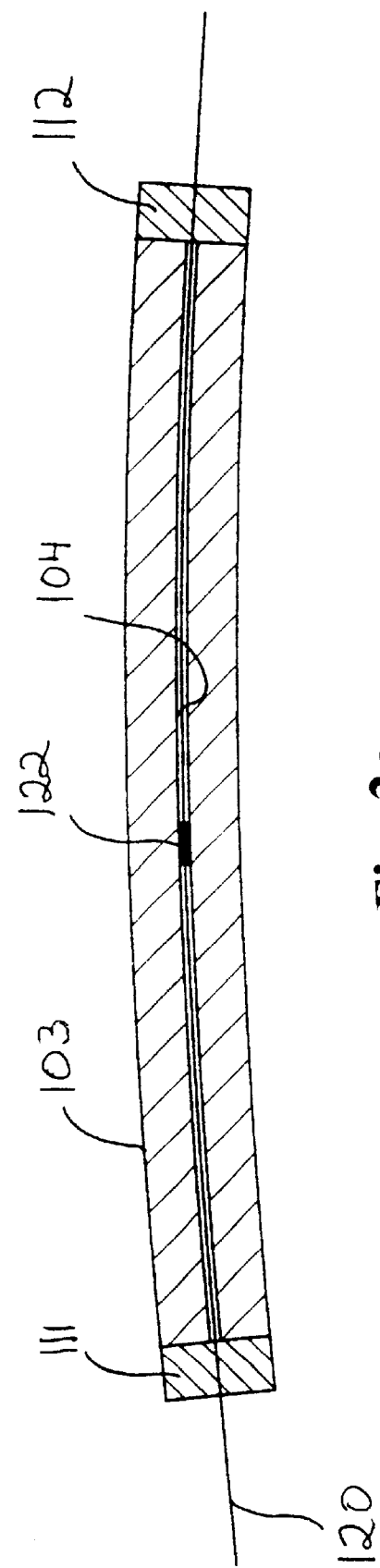
FIG. 2a shows the device from FIG. 2 during bending.

FIG. 2 shows an embodiment of a second sensor for use in a device according to the present invention, and comprises a generally cylindrical housing 103 having an inner cylindrical bore 104. As is apparent from FIG. 5, the housing 103 can, for the second sensor, be attached to the first housing 101 at the anchoring point 111. Inside the bore 104 in the second sensor is located an optical fibre 120 prestressed between the anchoring points 111 and 112. However, the bore 104 has an inner diameter slightly larger then the external diameter of the fibre 120, which then forces the fibre 120 with the grating 122 to follow the axis in the housing 103 in bending the same. FIG. 2a shows this second sensor during strong bending.

During bending of the second sensor, the Bragg grating will be curved in step with the housing 103, and thus not relaxed as a result of the bending. Light reflected from this Bragg grating 122 will then only be influenced by tension and thermal effects from the surrounding atmosphere and from the next construction which is to be measured.

Figure 3:
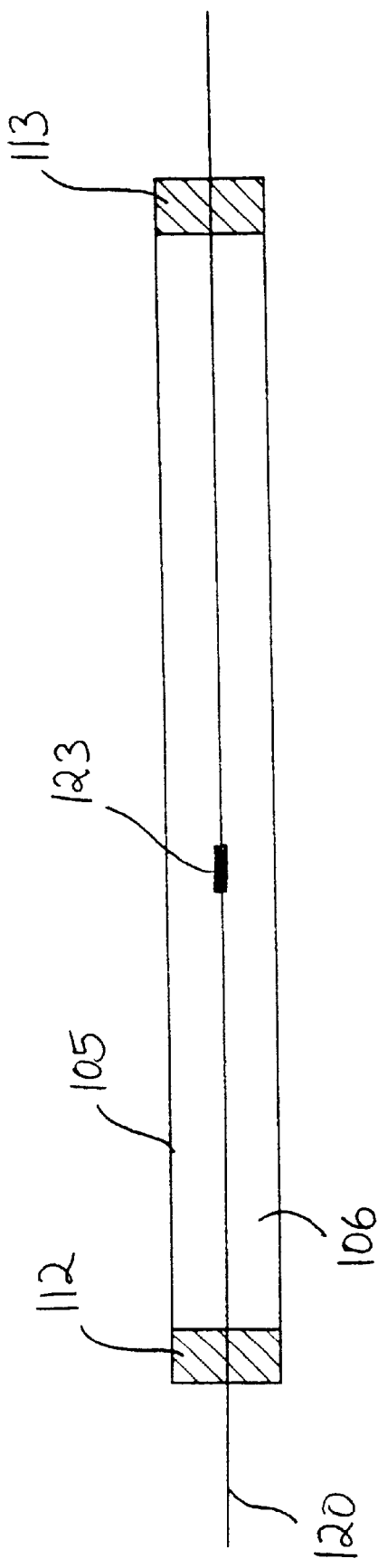
FIG. 3 shows an axial cross-section view of a third sensor for use in a device according to the present invention for monitoring bending in mechanical structures.
Figure 3A:
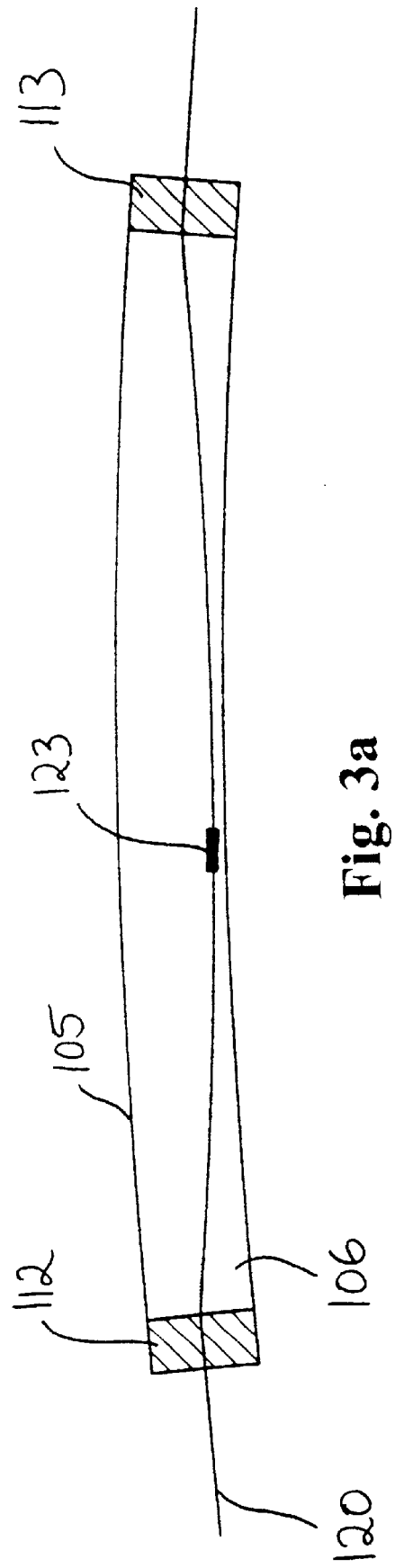
FIG. 3a shows the device from FIG. 3 during bending.

FIG. 3 shows an embodiment of a third sensor for use in a device according to the present invention. The third sensor comprises a generally cylindrical housing 105 having an inner cylindrical bore 106. As is apparent from FIG. 5, the housing 105 can be attached to the second sensor at anchoring point 112. Inside the bore 106 in the third sensor is located an optical fibre 120 mounted unstressed between a first and second anchoring point 112 and 113 located at respective ends of the housing 105. The third Bragg grating is located in the fibre section which is suspended between the anchoring points 112 and 113. The bore 106 has (like bore 102 of the first sensor) an inner diameter which is sufficiently large enough not to expose the grating to a tension load during bending that is too large. Since the fibre 120 of the third sensor is not prestressed, it will not be relaxed at the initial bending. Length and diameter of the housing will vary with the particular area of use.

During bending of the third sensor, the Bragg grating 123 in the optical fibre section that is not prestressed, will only to a small degree be exposed to load from bending and tension of the housing. However, Bragg grating 123 will be substantially effected from changes in temperature caused by the surrounding atmosphere or the next construction which is to be measured. In this way, the device can be compensated for temperature-caused displacement in the wave length in light reflected from the Bragg grating 123. The device according to present invention is calibrated at different temperatures in order to achieve a best possible temperature dependent measurement of wavelength-shift as a function of bending.

An alternative for avoiding mechanical influence of the grating 123 in the third sensor used for temperature compensation is to connect it to, for example, a tube 107 by means of a glue joint, as shown in FIG. 4. The tube 107 (not connected to the housing 105) will then isolate the grating 123 from bending and tension as shown in FIG. 4a. The tube 107 can be a metallic tube or alternatively a glass rod with grooves for the optical fibre.

Figure 5:
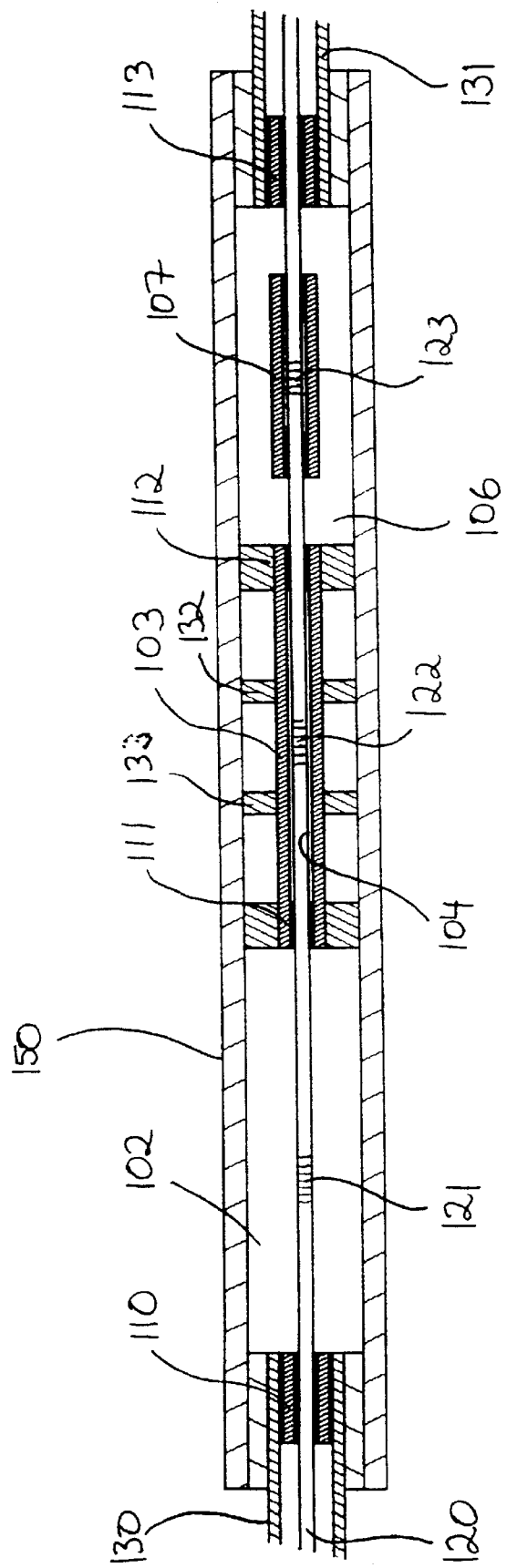
FIG. 5 shows an example of how a bending sensor based upon a compensation of effects from tension and temperature can be produced.

FIG. 5 shows a device according to the present invention with first, second and third sensors each with different responses to bending integrated in the device. The device comprises a longitudinal housing 150, for example in the shape of a tube, with the respective sensors distributed along the length of the housing 150 and situated next to each other. The housing 150 accomodated the respective sensors 101, 102 and 103. The housing 150 is connected externally to a surrounding mechanical construction (to be measured for bending) over the entire length (for example by gluing) or at the anchoring points 110, 111, 112 and 113.

When the housing 101 is bent, first Bragg grating 121 will shorten because the fibre is situated in a straight length between the anchoring points 110 and 111. The second Bragg grating 122 in the bore 104 will experience a substantially smaller change in length because it is forced to follow the axis of the housing. The third grating will not be influenced by bending of the construction.

In this way, the wavelength shift caused by bending, tension and temperature can be separated. The housing for all sensor means in this embodiment is carried out as a common tube. The second sensor means is carried out by locating a cannula tube 103 with support rings 131 and 132 along the axis. The fibre can also be protected on both sides of the bending sensor with cannula tubes 130 and 131, whichhen consitutes a small and solid cable.

If the bending influenced housing 101 is fixed at the two points 110 and 111, the grating 121 will change the prolongation $\epsilon_1$ according to the following equation:

$$\epsilon_1 = L^2/24 \cdot R^2$$

where L is the distance between the fixing points 110 and 111 in the housing 101, and R is the bending radius for the housing. The second grating 122 will not experience the longitudinal force due to bending.

If the housing 101, 102 and 103 is glued to the surrounding construction over the entire length and is exposed to tension in addition to bending, the relative prolongation of the housings $\epsilon_H$ will be the same as in the surrounding construction. This will give the same contribution to all of the housings.

In one embodiment, the entire device in made of metal, except for, of course, the optical fibre. In applications where the diameter of the bending sensor is especially important, both housing 101, 103, 105 and inner tube 107 are made from cannula tubes. The bending sensor can be constructed with a housing and tubes diameter of mere millimeters.

From the foregoing description it is evident for a person skilled in the art that the various components do not necessarily have the geometry showed by the drawings. For example, the member to be exposed to bending may have a cross-section that deviates from a circular shape; it may be oval, square etc. The same applies to the other components. The central issue with the invention is, however, that the member to be exposed to bending shall be able to transmit length change further to the connected Bragg grating.

The invention thus provides a device for measuring bending in mechanical constructions, which enables measurement over a broad range of stresses, with high precision and which simultanously compensates for deviations caused by temperature fluctuations. In addition, the device according to the present invention can be designed to be very small and can therefore be installed in places where bending measurement usually has not been possible. Another advantage with the device according to the invention is that the fibre is not exposed to external hydrostatic pressure, and will therefore exhibit a high reliability. Finally, this design does not require pressure tight connections for the fibre.

What is claimed is:

1. Device for measuring bending loads in constructions, characterized in that the device includes a housing (150) provided with:
    a first sensor for measuring a bending load, said sensor including a housing (101) connected to an optical fibre (120) mounted/prestressed in a first anchoraging point (110) and a second anchoraging point (111) by the housing, wherein the fibre (120) is provided with a first Bragg grating (121), located in the prestressed fibre, and housing (101) being arranged so that the fibre (120), when exposed to a strong bending force on the housing, is not brought in contact therewith and is exposed to tension load,
    a second sensor for measuring tension load, said sensor including a housing (103) connected to an optical fibre (120) prestressed in a first anchoraging point (111) and a second anchoraging point (112) by the housing, wherein the fibre (120) is provided with a second Bragg grating (122), located in the mounted/prestressed fibre, the housing (105) being arranged with an element (103, 104) forcing the fibre to be bent along with the housing (103),
    a third sensor for measuring temperature, said sensor including a housing (105) attached to an optical fibre (120) suspended in a first anchoring point (112) and a second anchoring point (113) by the housing without prestressing the fibre, wherein the fibre (120) includes a third Bragg-grating (123) located in the suspended fibre, the housing (105) being arranged so that the fibre (120), by a strong bending or tension of the housing, is not brought into contact therewith and is exposed to tension load,
    wherein one or more of the respective sensors are arranged sequentially in the housing (150) along the common optical fibre (120).

2. Device according to claim 1, characterized in that the housing (101) has a generally cylindrical shape.

3. Device according to claim 1, characterized in that the anchoring points (101, 103, 105, 150) are glue joints.

4. Device according to claim 1, characterized in that the element (103, 104) in the second sensor is a cannula tube (103) arranged between two anchoring points (111 and 112) so that the bending properties is approximately similar in all elements.

5. Device according to claim 4, characterized in that the cannula tube (103) is arranged in the housing (150) and is supported by one or more ring shaped elements (132, 133) against the inner side of the housing (150).

6. Device according to claim 1, characterized in that the third Bragg grating (123) for temperature compensation, located in the third sensor is arranged in a freely suspended tube (107) for reducing influence on the grating (123) from bending and tension.

7. Device according to claim 1, characterized in that tubes (130 and 131) are provided connected to respective ends of the housing (150) for carrying the optical fibre (120) and protect the fibre and the interior of the device against the surroundings.

* * * * *